United States Patent
Shen et al.

(10) Patent No.: US 7,490,111 B2
(45) Date of Patent: Feb. 10, 2009

(54) EFFICIENT HANDLING OF MOSTLY READ DATA IN A COMPUTER SERVER

(75) Inventors: Jinmei Shen, Rochester, MN (US); Hao Wang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 11/422,687

(22) Filed: Jun. 7, 2006

(65) Prior Publication Data
US 2007/0288524 A1    Dec. 13, 2007

(51) Int. Cl.
*G06F 12/00*  (2006.01)
*G06F 17/30*  (2006.01)
*G06F 17/00*  (2006.01)

(52) U.S. Cl. .................. 707/200; 709/223; 709/217; 707/204

(58) Field of Classification Search .................. 707/200
See application file for complete search history.

(56) References Cited

U.S. PATENT DOCUMENTS

| | | | |
|---|---|---|---|
| 6,263,360 B1 * | 7/2001 | Arnold et al. | 709/203 |
| 7,100,076 B2 * | 8/2006 | Johnson et al. | 714/13 |
| 2002/0010783 A1 * | 1/2002 | Primak et al. | 709/228 |
| 2003/0088672 A1 * | 5/2003 | Togasaki | 709/226 |
| 2005/0038828 A1 * | 2/2005 | Kaluskar et al. | 707/200 |
| 2007/0276873 A1 * | 11/2007 | Vahdat et al. | 707/200 |

OTHER PUBLICATIONS

Birgit Roehm, Balazs Csepregi-Horvath, Pingze Gao, Thomas Hikade, Miroslav Holecy,Tom Hyland, Namie Satoh, Rohit Rana, Hao Wang;IBM Redbooks:"IBM WebSphere V5.1 Performance, Scalability,and High Availability"; http://www.redbooks.ibm.com/redbooks/pdfs/sg246198.pdf; Jun. 2004; Chapter 4,5,6,10,11,12.*

* cited by examiner

*Primary Examiner*—Tony Mahmoudi
*Assistant Examiner*—Dennis Truong
(74) *Attorney, Agent, or Firm*—Bret J. Petersen; Martin & Associates, LLC

(57) ABSTRACT

An apparatus and method is described for improving access to mostly read data on network servers. The preferred embodiments more efficiently utilize replicated data servers to minimize server response time for improved performance of data access to network servers by workload managing client requests across the primary server and all replicated servers when it is possible to do so. In preferred embodiments, a load balancer supplies the most current data for mostly read data transactions while maximizing server usage by workload managing client requests across the primary server and all replicated servers. Client requests are managed by a load balancer in the workload manager. Client requests are sent by the load balancer to replicated servers when a routing table (stale data marker list) indicates that the data is in a safe period. Clients are directed exclusively to the primary server only during data update times.

1 Claim, 8 Drawing Sheets

EFFICIENT HANDLING OF MOSTLY READ DATA IN A COMPUTER SERVER

BACKGROUND OF THE INVENTION

1. Technical Field

This invention generally relates to computer servers and more specifically relates to an apparatus and method for efficiently handling mostly read in a computer server environment that maintains data integrity while maximizing server utilization through workload management.

2. Background Art

Essential to computer performance is the timely availability of data. Computer systems often employ servers that are connected over a network to provide data files and software application files to a number of client machines. The same data is replicated onto multiple servers to achieve high availability, scalability of the systems and higher performance. High availability means availability despite planned outages for upgrades or unplanned outages caused by hardware or software failures through fragmentation and replication of data across multiple servers.

In HA systems and in other computer systems, duplicate data is stored on multiple servers to timely respond to request from many differently clients. Typically, a workload manager with a dispatcher is used to manage the workload of the client requests to ensure efficient utilization of the servers to maximize the performance of the servers. Data stored on a server can generally be classified as one of four types: 1) read/write data, 2) mostly read data with a specific update period, 3) mostly read data with uncertain update times, and 4) read only data. If data stored on the servers is read only data, then workload management can simply direct client requests to access any server. FIG. 2 shows how a client 210 may access the data on any server 212 for read only transactions 214. Since the read only data is current in all the servers, the request for read-only data can be routed to the primary server 216 and to the replicated servers 218, 220.

However, if the data stored on the server is type 1, 2 or 3, then only the data on the primary server 216 is always valid and current. With these other types of data, such as read/write transactional data and mostly read data, the data stored in different servers may be different during data updates. Therefore, for these types of data transactions 222, all clients data requests are directed to the primary server only and all replicated servers are not used for these operations. FIG. 3 illustrates the work load manager (not shown) directing data requests 222 by all clients 212 to the primary server 216. Also, FIG. 3 illustrates the typical situation in HA systems, where all access is made to the primary server, and the other servers are replicated on a delayed basis. These replicated servers are wasted in terms of client access usage. The replicated servers are used only when primary servers fail, but since it is very rare for the primary servers to fail, the servers are not well utilized.

In the prior art, when data stored on the server is mostly read data, the primary server must be used to guarantee the data is current (not stale). Since up to 80% of a typical database contains mostly read data with very few updates and a large number of reads, large amounts of server resources are wasted, and scalability and performance are greatly diminished. Since mostly read data is updated infrequently, the replicated servers could be better utilized at times when they are current and the data is not stale. Without a way to more efficiently utilize servers for mostly read data, the computer industry will continue to suffer from slower response and less efficient utilization of network servers.

BRIEF SUMMARY OF THE INVENTION

According to the preferred embodiments, an apparatus and method is described for efficient utilization of replicated data servers to minimize server response time and to enable larger scalability to support many concurrent clients. In preferred embodiments, a load balancer supplies the most current data for mostly read data transactions while maximizing server usage by workload managing client requests across the primary server and all replicated servers. Client requests are managed by a load balancer in the workload manager. Client requests are sent by the load balancer to replicated servers when a routing table (stale data marker list) indicates that the data is in a safe period. Clients are directed exclusively to the primary server only during data update times.

While the preferred embodiments described herein are directed to the WebSphere server environment, the claimed embodiments herein expressly include other web server environments with their associated architectures and files.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The preferred embodiments of the present invention will hereinafter be described in conjunction with the appended drawings, where like designations denote like elements, and:

DETAILED DESCRIPTION OF THE INVENTION

The present invention relates to application servers and in particular the WebSphere application server is used for the illustrated examples. For those who are not familiar with WebSphere and application servers, the brief overview below provides background information that will help the reader to understand the present invention.

1. Overview

WebSphere Application Server in the WebSphere Environment

WebSphere is the IBM brand of software products that are designed to work together to deliver dynamic e-business solutions for connecting people, systems, and applications with internal and external resources. The WebSphere environment of software products includes an application server. WebSphere is based on infrastructure software (middleware) designed for dynamic e-business. It delivers a secure, and reliable software portfolio. The technology that powers WebSphere products is Java™. Over the past several years, many software vendors have collaborated on a set of server-side application programming technologies that help build Web accessible, distributed, platform-neutral applications. These technologies are collectively branded as the Java 2 Platform, Enterprise Edition (J2EE). This contrasts with the Java 2 Standard Edition (J2SE) platform, with which most clients are familiar. J2SE supports the development of client-side applications with rich graphical user interfaces (GUIs). The J2EE platform is built on top of the J2SE platform. J2EE consists of application technologies for defining business logic and accessing enterprise resources such as databases, Enterprise Resource Planning (ERP) systems, messaging systems, e-mail servers, and so forth. Enterprise JavaBeans (EJB) technology is the server-side component architecture for Java Platform, Enterprise Edition (Java EE). EJB technology enables rapid and simplified development of distributed, transactional, secure and portable applications based on Java technology.

2. Detailed Description

According to a preferred embodiment of the present invention, an apparatus and method is described for efficient utilization of replicated data servers to minimize server response time and to enable larger scalability to support many concurrent clients. The preferred embodiments described herein make it possible to efficiently work load manage data requests across all servers (both primary and replicas) while ensuring data integrity and data freshness.

Figure 1:
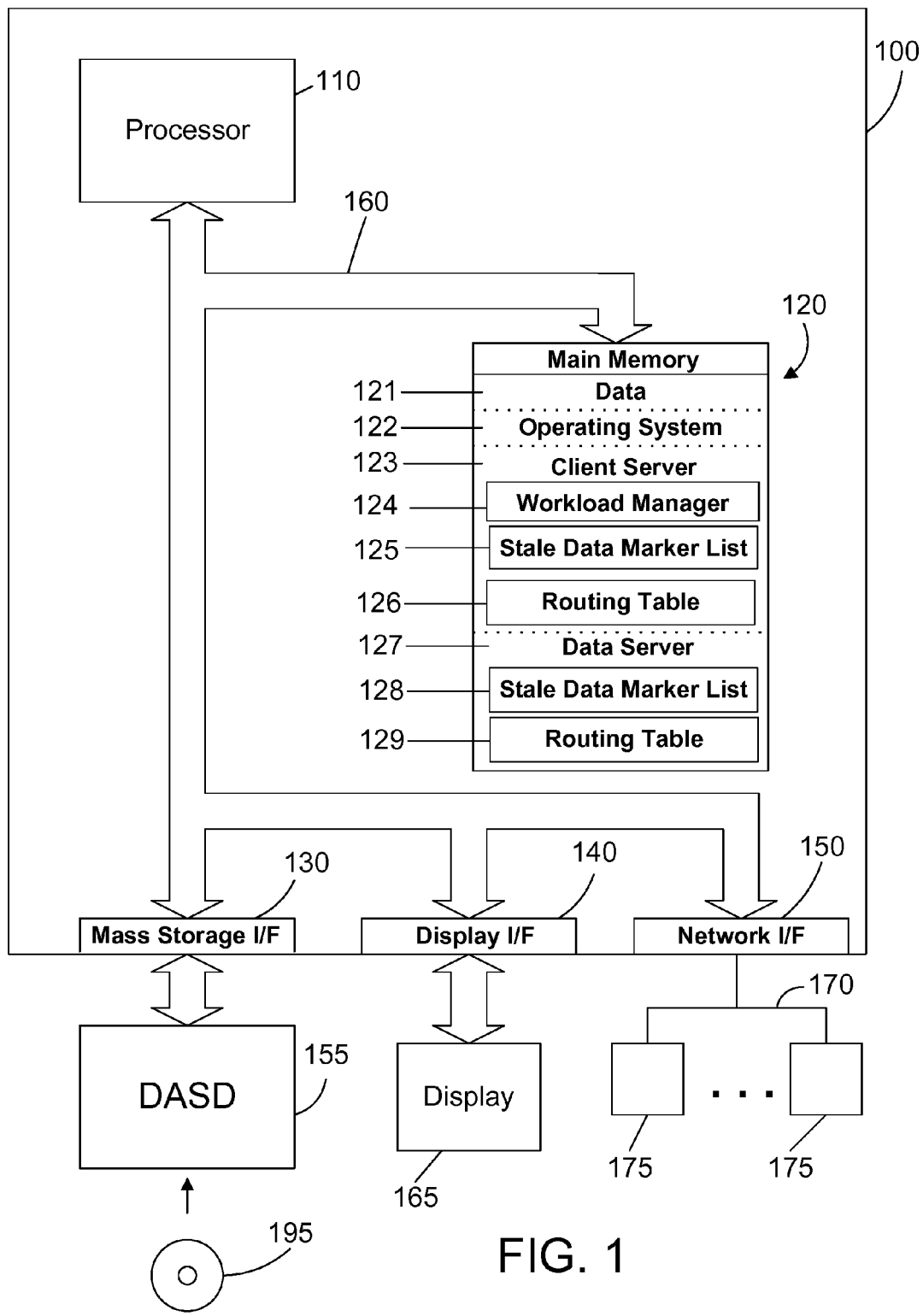
FIG. 1 is a block diagram of an apparatus in accordance with a preferred embodiment of the present invention.
Figure 2:
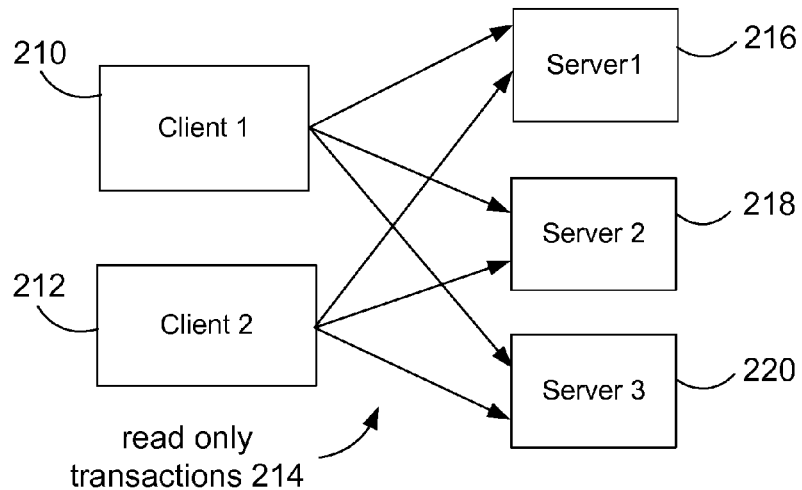
FIG. 2 is a block diagram that represents read only transactions by clients to network servers according to the prior art.
Figure 3:
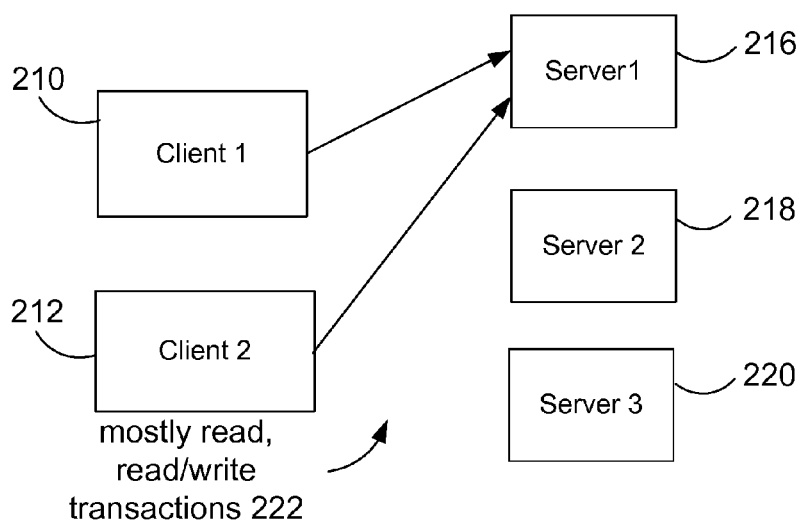
FIG. 3 is a block diagram that represents mostly read and read/write transactions by a client to network servers according to the prior art.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a client server 123, and a data server 127. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system. Client server 123 and data server 127 are software systems similar in many respects to those known in the art, but with additional features that are not known in the art. The client server 123 includes a workload manager 124 that manages client requests to data as described below. In preferred embodiments, the data server 123 includes a stale data marker list 125 that is used in conjunction with a routing table 126. The data server 127 also includes a stale data marker list 128 that is used in conjunction with a routing table 129. These elements of the preferred embodiments are described further below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, client server 123, and data server 127 are shown to reside in main memory 120, those skilled in the art will recognize that these items are not necessarily all completely contained in main memory 120 at the same time. In fact, the client server 123 and the data server 127 are most likely to reside in different computer systems as described below. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable media used to actually carry out the distribution. Examples of suitable computer-readable media include: recordable type media such as floppy disks and CD RW (e.g., 195 of FIG. 1), and transmission type media such as digital and analog communications links. Note that the preferred computer-readable media is tangible.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more objects or programs that reside on computer system 100. This cooperative processing could be accomplished through use of one of the well known client-server mechanisms such as remote procedure call (RPC).

Figure 4:
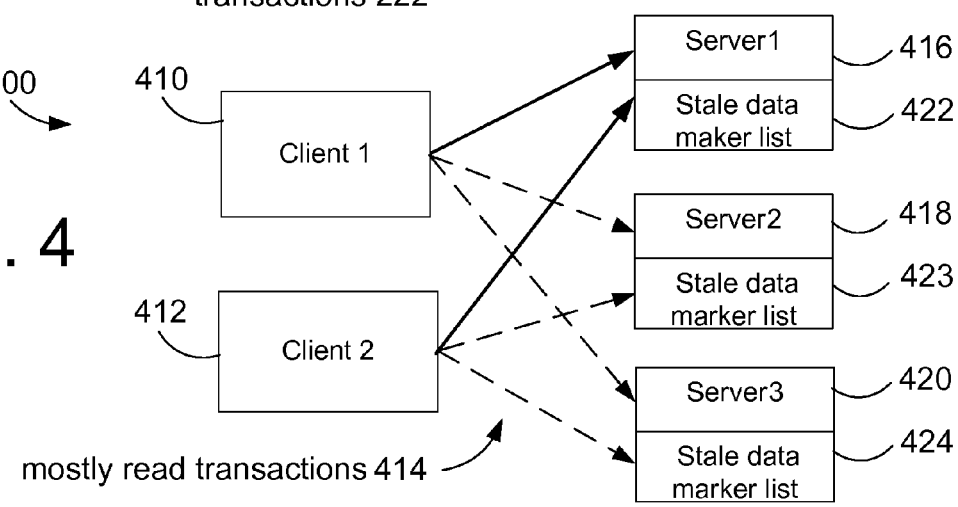
FIG. 4 is a block diagram that represents mostly read transactions by clients to network servers according to preferred embodiments.

According to preferred embodiments, an apparatus and method is described for efficient utilization of replicated data servers to minimize server response time. The preferred embodiments described herein make it possible to efficiently work load manage data requests across both primary and replicated servers while ensuring data integrity and data freshness. FIG. 4 illustrates a computer network system 400 that directs client requests according a preferred embodiment for more efficient utilization of replicated data servers. The client computers 410, 412 are able to access the most current data for mostly read data transactions while maximizing server usage by workload managing client requests across the primary server and all replicated servers by monitoring when data is fresh or stale on the servers. Requested data is supplied exclusively from the primary server 416 for data requests (mostly read transactions 414) when data on the replicated servers is stale. Mostly read type data on the replicated servers is stale during update and replication times. Mostly read transactions 414 are directed only to the primary server when the data on the replicated servers is stale as shown by the solid lines in FIG. 4. At other times, when updates are not occurring and thus the data that is replicated across the other servers is fresh or current data, the data requests are workload managed across all the servers 416, 418, and 420 as shown by the dashed lines from the clients 410, 412.

In the preferred embodiments the servers 416, 418 and 420 each have a stale data marker list 422, 423, 424 that corresponds to the stale data marker list shown in the data server 124 of FIG. 1. The stale data marker lists 422, 423, 424 indicate what data is stale or not current. The system is then able to determine when to exclusively access the primary server 416 or when fresh data can be workload managed across all the servers as described above. The stale data markers in list 422, 423, 424 are similar to dirty bits used in a computer memory cache. The stale data marker list is used in conjunction with the routing table to determine where to access data. The stale data marker list can be viewed as an extension of the routing table. The routing table contains a list of all end points that have data, including the primary and server replicas. The routing table is used by the workload manager in conjunction with the stale data list to determine where to access data. When a request for data is processed by the workload manager, the stale data marker list is checked to see if the requested data has an entry in the stale data list. Any data that is stale or in the process of being updated in the replicated servers is marked in the stale data marker list 422 so that any clients that request this data are routed to the primary server only to ensure data integrity. In the preferred embodiments, the stale data marker list has a key for each entry that is associated with the stale data as described further below.

Figure 5A:
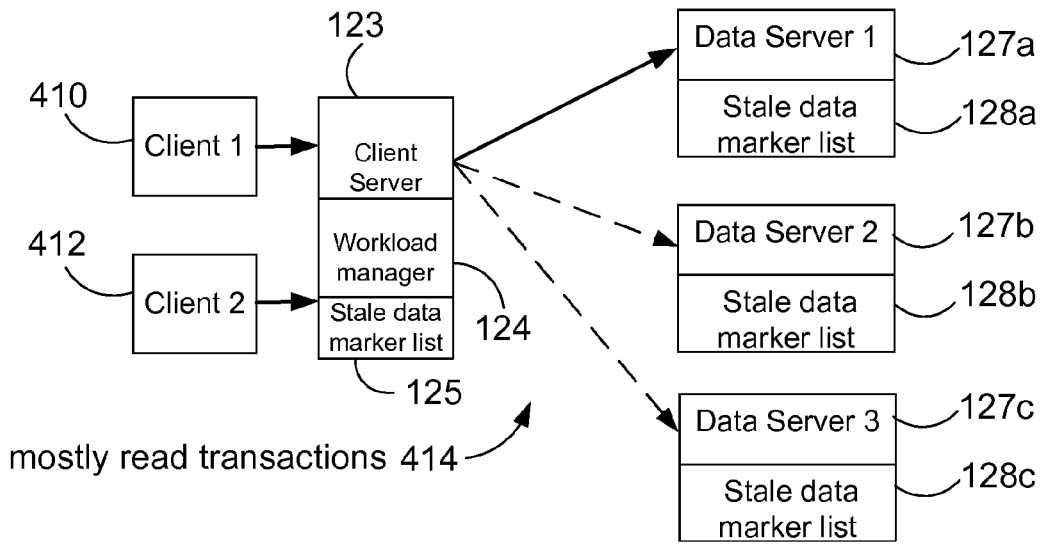
FIG. 5a is a block diagram that represents read only transactions by multiple clients through a single client server to network servers according to preferred embodiments.

FIG. 5a illustrates a system topography for implementing the functionality described with FIG. 4 to maximize the efficiency of replicated servers according to preferred embodiments. Client 1 410 and Client 2 412 access data on the primary server (data server1) 127a and the replicated servers 127b, 127c as described above. Data access by client 1 and client 2 is facilitated by a client server 123. The client server 123 includes a workload manager 124. The workload manager 124 and the client server 123 operate similar to prior art workload management techniques that workload manage read only data requests to replicated servers. In contrast to the prior art, the workload manager 124 of the preferred embodiments uses the stale data marker lists 125, 128a, 128b, 128c to workload manage mostly read data requests to the replicated servers as described herein. The stale data marker lists 128a, 128b, and 128c are local replicas of the stale data marker list 125. The stale data marker lists 128a, 128b, and 128c are updated and include a timestamp as described further below.

Figure 5B:
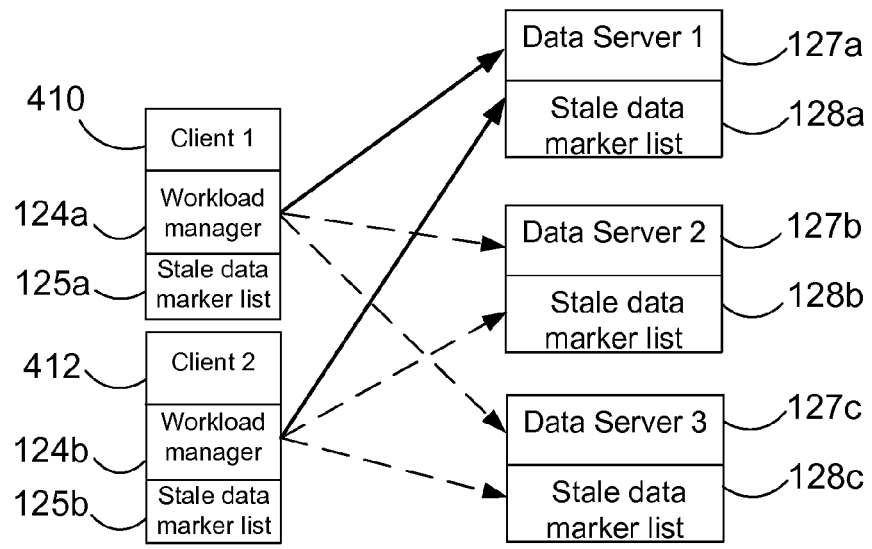
FIG. 5b is another a block diagram that represents read only transactions by clients with different workload managers to access network servers according to preferred embodiments.

FIG. 5b illustrates another topography for implementing an apparatus for maximizing the efficiency of replicated servers to access mostly read data according to preferred embodiments. The system in FIG. 5b operates in a similar manner as the system described above with reference to FIG. 5a. Client1 410 and client 2 412 access data on the primary server (data server1) 127a and the replicated servers 127b, 127c as described above. In this system, the workload manager is incorporated on the client side of the system and shown included in the clients 410, 412. In preferred embodiments, the clients 410, 412 are Java virtual machines (JVMs). Client 1410 includes a workload manager 124a with a stale data list 125a, and Client 2 412 includes a workload manager 124b with a stale data list 125b. The stale data marker lists 124a, 124b are updated separately by the corresponding workload manager as described below with reference to FIG. 11. In this manner, many clients from different machines or different JVMs can be supported as described herein to workload managed mostly read data on replicated servers.

The two topologies of FIGS. 5a and 5b illustrate how the workload manager is located one level ahead of target server for different topologies. In a preferred embodiment of a multiple tier architecture, the workload manager is in the WebSphere edge server to work load manage http server requests. In another embodiment, the workload manager is in http servers to work load manage servlet requests into WebSphere application server Web Containers. In another embodiment, the workload manager is in a WebSphere application server servlets containers to workload manage requests to WebSphere application server EJB containers. In another embodiment, the workload manager can be in EJB containers to workload manage requests to different database servers. One server can act as client of another server. In the client mode shown in FIG. 5b, for example, java clients, or client clients download the routing table (stale data marker list) on the fly to direct requests to different servers.

Figure 6:
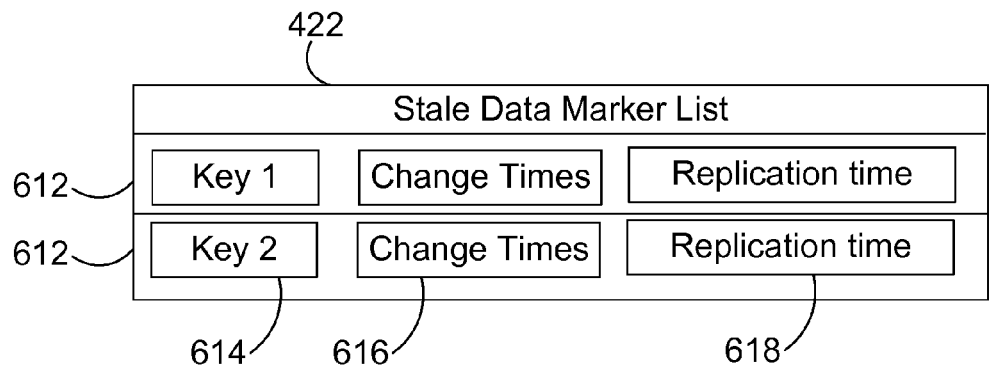
FIG. 6 is a block diagram that represents the contents of a stale data marker list according to preferred embodiments.

FIG. 6 illustrates additional detail of the stale data marker list 422 according to preferred embodiments. The stale data marker list 422 includes a list of stale data markers 612, where each stale data marker is an entry in the list. In preferred embodiments, each stale data marker 612 has a key 614 and one or more corresponding change times 616 and a replication time 618 or cool down period. The key 614 is preferably an index key for a data set stored on the data server that can be accessed by a client. The key can be any type of pointer or reference to identify data on the server. The change times 616 for each key 614 is the times when the data in the database corresponding to the data key is being updated. The data is updated by the primary server in response to client requests (insert, update, or delete). A stale data marker 612 is placed in the stale data marker list by a continuous running process of the workload manager that monitors data updates in the system. The stale data marker is valid within the replication time 618 after the change time 616. When the stale data marker is valid the stale data marker 612 is placed in the stale data marker list. The stale data marker list is cleared of non-valid stale data markers by another process described further below.

The replication time 618 in the stale data marker list 422 is a calculated amount of time required to propagate the change in data from the primary server to all the respective replicas of the primary server. The replication time 618 is the time to wait after the change time 616 before it is statistically safe to access data corresponding to the respective key 614 on a replicated server. The replication time 618 is the statistically calculated propagation time for 1 sigma, 2 sigma, 3 sigma or for some percentage of the data to be propagated from the primary server to the replicated servers. In preferred embodiments, the sigma level or percentage is user definable. Therefore, beginning at the change time and before the change time plus the replication time is the unsafe period, where it is unsafe to access the corresponding data from the server replicas because the data may be stale. Any time after the change time plus the propagation time and before the next change time is a safe period for clients to access data from the replicated servers. For mostly read data that is updated infrequently there is a large amount of safe period. For example, if the mostly read data is updated 24 times per day, and the geographical replication time take 2 minutes between data centers, then there is 58 minutes of safe period to access data from all replicated servers, and only 2 minutes of unsafe period. During the unsafe period, client requests are routed exclusively to the primary server to ensure data integrity and currency. In this way, scalability and server utilization can be substantially increased, as in this example by over 95%.

Figure 7:
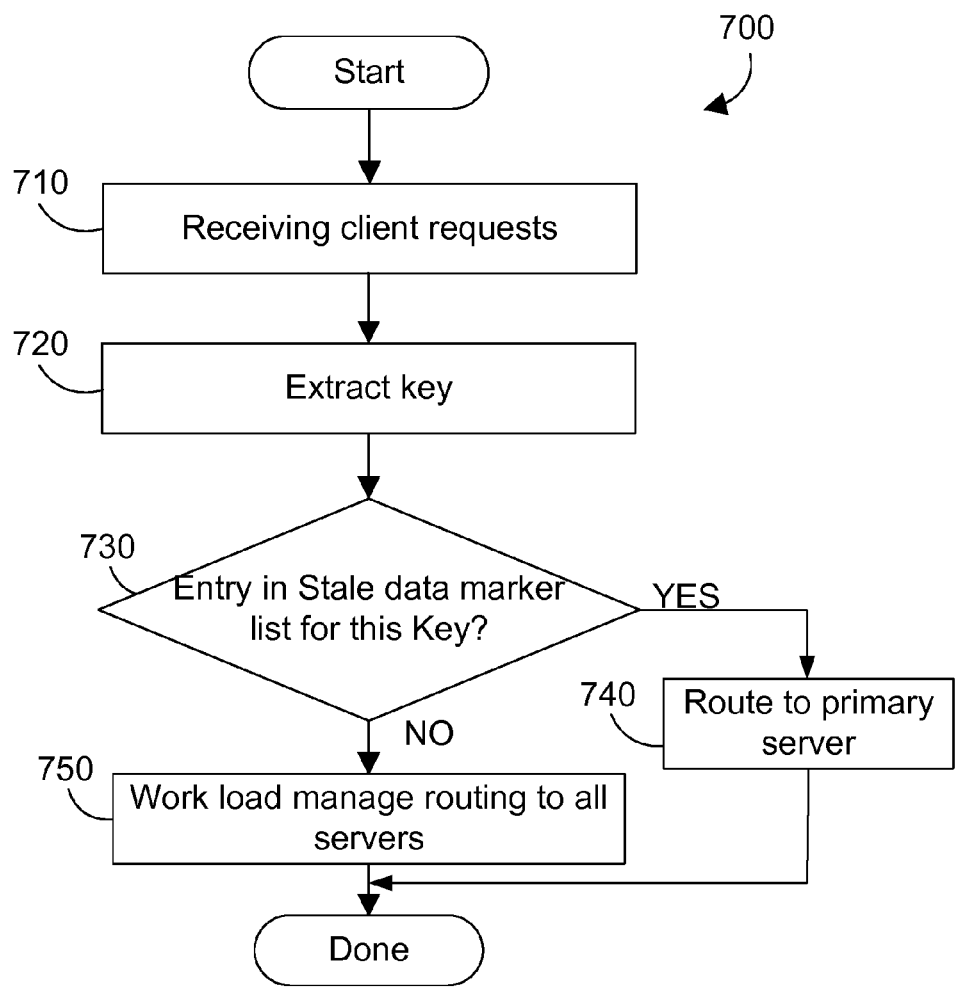
FIG. 7 is flow diagram that represents a method of request flow handling according to preferred embodiments.

Referring now to FIG. 7, a method 700 is shown according to preferred embodiments herein. Method 700 illustrates a method for implementing a workload manager to access data in a database using the keys in the stale data marker list according to preferred embodiments. The method begins with the workload manager receiving client requests for data (step 710). The data key for the client requested data is then extracted from the request (step 720). If the data is not stale since the corresponding key is not in the stale data list (step 730=no), then the load balancer in the work load manages the data requests by routing the data requests to all the servers (step 750) and the method is done. If the data is stale (the data key is in the stale data list) (step 730=yes), then the data is routed exclusively to the primary server (step 740) and the method is done.

Figure 8:
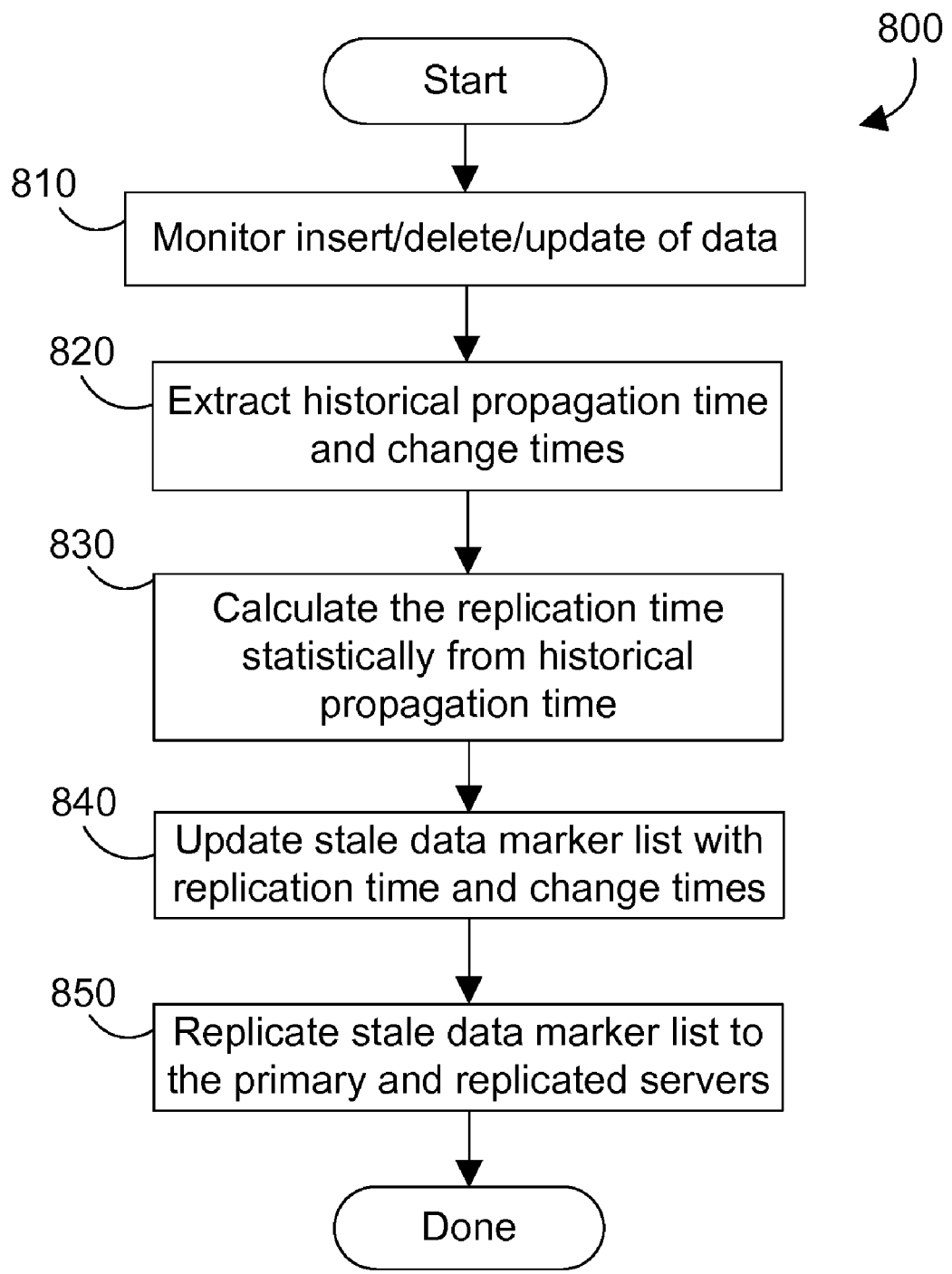
FIG. 8 is flow diagram that represents a method of creating and updating a stale data marker list according to preferred embodiments.

Referring now to FIG. 8, a method 800 is shown to create and broadcast the stale data marker list according to preferred embodiments herein. As shown in FIG. 4, the stale data marker list in preferred embodiments is maintained in each of the data servers to insure access is made to data on the replicated servers when the data is valid (not stale). In the preferred embodiments, the workload manager monitors access to data to update the contents of the stale data marker list, and then broadcasts the updates to each server's copy of the stale data marker list. The method 800 describes this process to maintain the stale data marker list. The workload manager monitors data access (insert, delete, update) (step 810) to the database. The propagation time is extracted from client accesses to the database (step 820). The propagation time is the actual amount of time used to make the updates to the replicated database servers to bring the data in those servers current with the data in the primary server. The propagation time is used to calculate a replication time to be stored in the stale data marker list (step 830). The replication time and change time are determined for the data corresponding to a key and the stale data marker list is updated (step 840). The stale data marker list is replicated to the primary and replicated servers (step 850). The method is then done.

Figure 9:
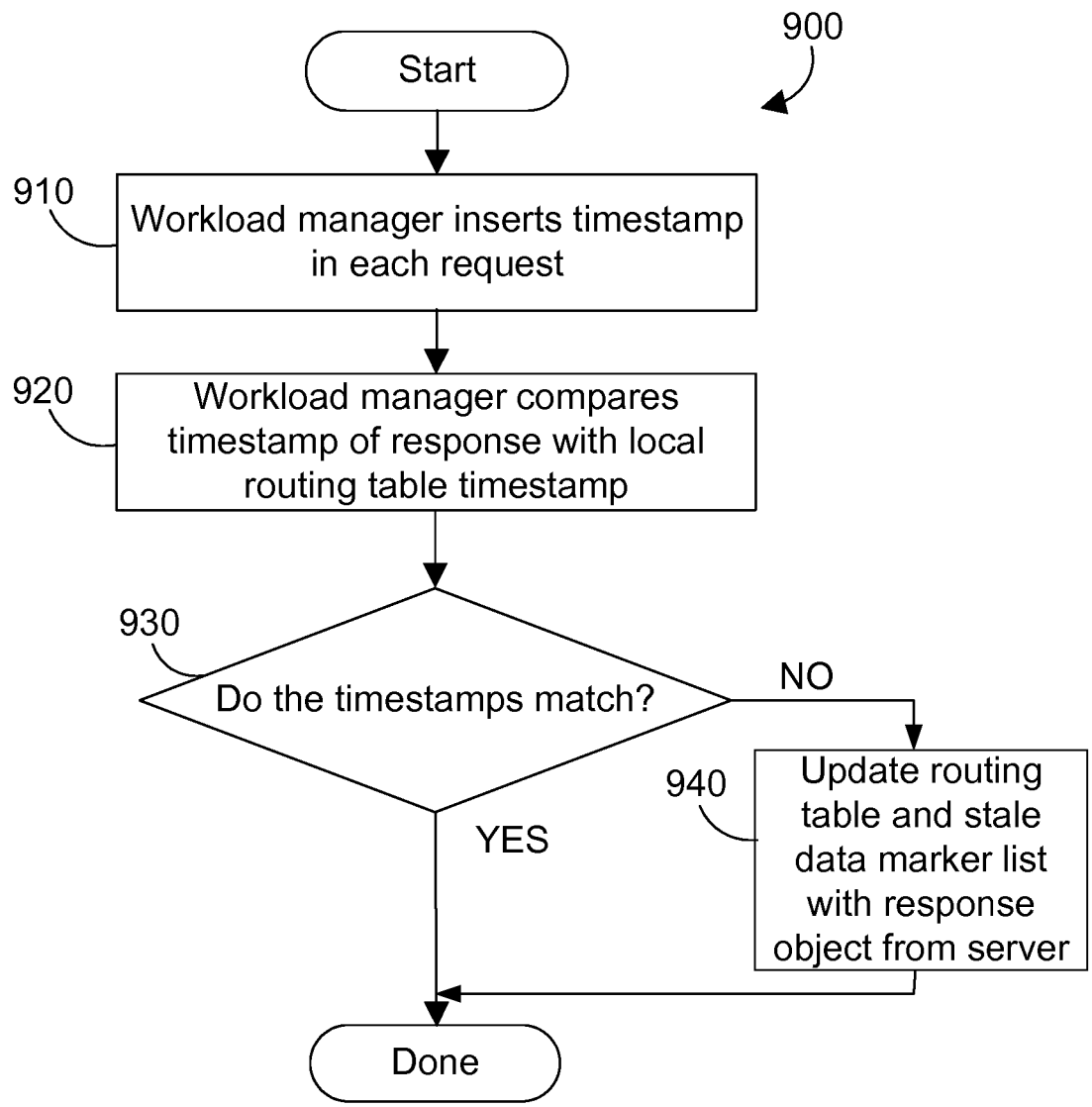
FIG. 9 is flow diagram that represents a method for comparing versions of a routing table and stale data marker list between the client side and server side according to preferred embodiments.
Figure 10:
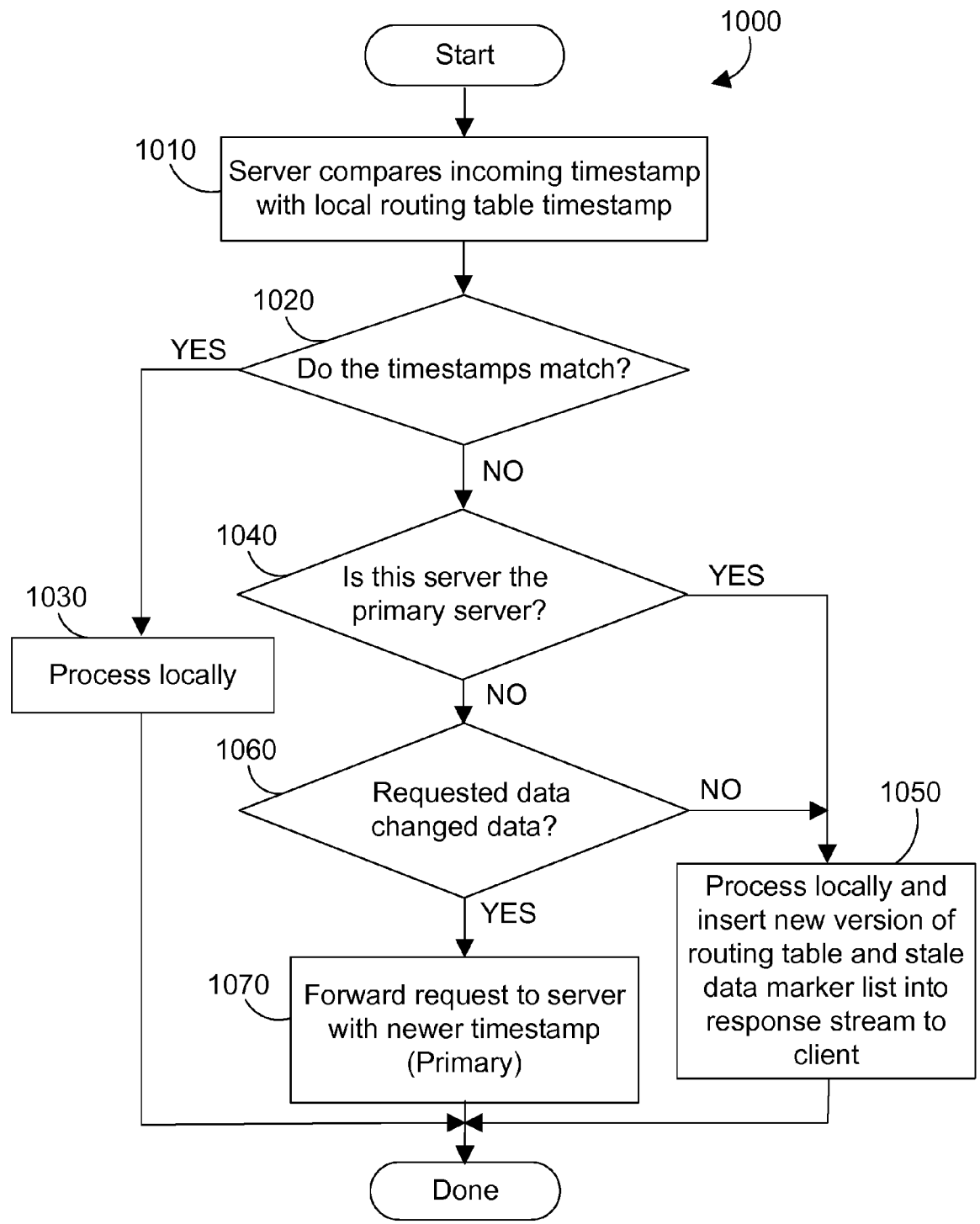
FIG. 10 is flow diagram that represents a method of forwarding requests for newly changed data according to preferred embodiments.

In preferred embodiments, the routing tables and stale data marker lists are maintained and coordinated using epochs or timestamps. The workload manager in the client server inserts a timestamp that reflects the state of the routing table and stale data marker list into the data request that is sent to the data server. When a client receives a response, the response carries a similar timestamp. If this response timestamp is newer, then the client server receives an update to the routing table and stale data marker list. On the data server side, when a request for data is received, the timestamp of the data request is compared to the timestamp of the local routing table and stale data marker list. If the timestamps do not match, the request is forwarded to a server with a newer routing table and stale data marker list, and if needed a new version of the routing table and stale data marker list is sent to the client server in a response to the data request. These operations are described further below with reference to FIGS. 9 and 10. FIG. 9 illustrates the actions on the client server side to maintain the routing tables and stale data marker lists. FIG. 10 illustrates operations on the data server side.

Referring now to FIG. 9, a method 900 is shown to update the server routing table and stale data marker list according to preferred embodiments herein. The workload manager on the client server side inserts an timestamp or epoch into the data request that is sent to the data server (step 910). The timestamp is the last update time of the stale data marker list on the server side. After a response from the data request is received, the workload manager compares the timestamp in the response with its local routing table timestamp to determine if the local routing table and stale data marker list is current (step 930). If the timestamps do not match and the local stale data marker list is not current (step 930=no), then the server updates its routing table and stale data marker list with response objects containing this information from the server (step 940). If the timestamps do match and the local stale data marker list is current (step 930=yes), then the method is done.

Referring now to FIG. 10, a method 1000 is shown to process data requests on the server according to preferred embodiments herein. The data server checks incoming requests with the server's local stale data marker list to insure data integrity. This is important when there is a change in the data but the change is not detected in time by the workload manager that dispatches this request. In this case, the server will detect the stale data by comparing the version of its own stale data marker list with the version inserted by client, and if they are different rerouting the data request to the primary server as will be described with reference to method 1000.

Method 1000 begins with the data server comparing the incoming timestamp with the local routing table timestamp to determine if the local stale data marker list is current (step 1010). If the local stale data marker list is current (the timestamps match) (step 1020=yes), then the data request is processed locally (step 1030) and the method is done. If the local stale data marker list is not current (the timestamps do not match) (step 1020=no), and the server is the primary server (step 1040=yes), then the data request is processed locally and a new version of the routing table and stale data marker list is send in the response stream to the client server (step 1050). If the timestamps do not match (step 1020=no), the server is not the primary server (step 1040=no), and the requested data is not changed data in the routing table and the stale data marker list (step 1060=no) then the data request is processed locally and a new version of the routing table and stale data marker list is send in the response stream to the client server (step 1050). If the timestamps do not match (step 1020=no), the server is not the primary server (step 1040=no), and the requested data is changed data in the routing table and the stale data marker list (step 1060=yes) then the data request is forwarded to the primary server (step 1070) and the method is done. The primary server will processes the request with this same method, which will result in a new version of the routing table and stale data marker list being sent in the response stream to the client server (step 1050).

Figure 11:
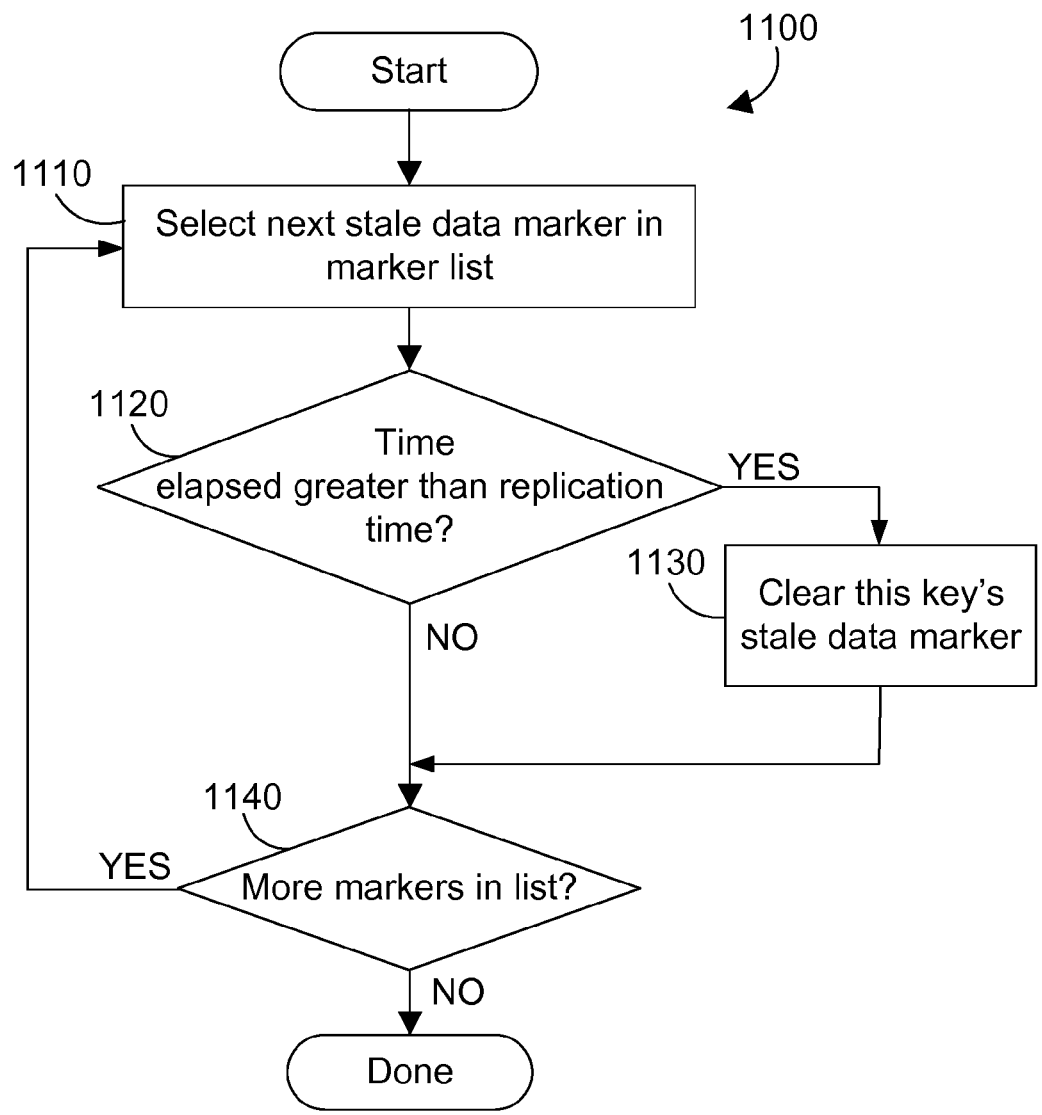
FIG. 11 is flow diagram that represents a method of cleaning stale data marker list entries after the replication time according to preferred embodiments.

Referring now to FIG. 11, a method 1100 is shown to process and update the stale data marker list according to preferred embodiments herein. In preferred embodiments, software according to this method is periodically run on the primary server to keep the stale data marker list up to date. The next stale data marker in the stale data marker list is selected to be updated (step 1110). If the elapsed time is greater than the corresponding replication time in the stale data marker list (step 1120=yes) then the stale data marker with this key is cleared from the stale data marker list (step 1130). If the elapsed time is not greater than the corresponding replication time in the stale data marker list (step 1120=no) then proceed to check the next data marker (step 1140). If there are more markers in the list (step 1140=yes) then jump to step 1110. If there are no more markers in the list (step 1140=no) then the method is done.

An apparatus and method has been described for improving access to mostly read data on network servers. The preferred embodiments more efficiently utilize replicated data servers to minimize server response time for improved performance of data access to network servers by workload managing client requests across the primary server and all replicated servers when it is possible to do so.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. A computer method for workload managing data request transactions, the method comprising the steps of:
    (A) a WebSphere client server receiving a data request from a client;
    (B) extracting a key from the data request;
    (C) routing the data request to a primary server if data corresponding to the key is stale;
    (D) routing the data request to a replicated server if the data corresponding to the key is not stale;
    (E) monitoring changes to the data on the primary server and the replicated server;
    (F) extracting historical propagation times and change times from the changes to data on the primary and replicated servers;
    (G) calculating a replication time from the propagation time and change times as a statistical safe time to access data on the replicated server;
    (H) updating a stale data marker with the replication time;
    (I) replicating the stale data marker to one or more replicated data servers;
    (J) inserting a timestamp for a stale data marker in a request for data to a data server;
    (K) the data server comparing the timestamp with a timestamp for a local stale data marker list;
    (L) forwarding the request for data to a primary server if the timestamps do not match and processing the request for data at the replicated data server if the timestamps match;
    (M) processing a stale data maker list comprising the steps of:
        1. selecting the next stale data marker in a stale data marker list;
        2. determining if the stale selected next stale data marker is still needed by comparing the time elapsed with the replication time; and
        3. clearing the stale data marker from the stale data marker list if the elapsed time is greater than the replication time.

* * * * *